E. J. BROCK
March 22, 1932. WATER PURIFIER Re. 18,388
2 Sheets-Sheet 1
Original Filed May 22, 1926
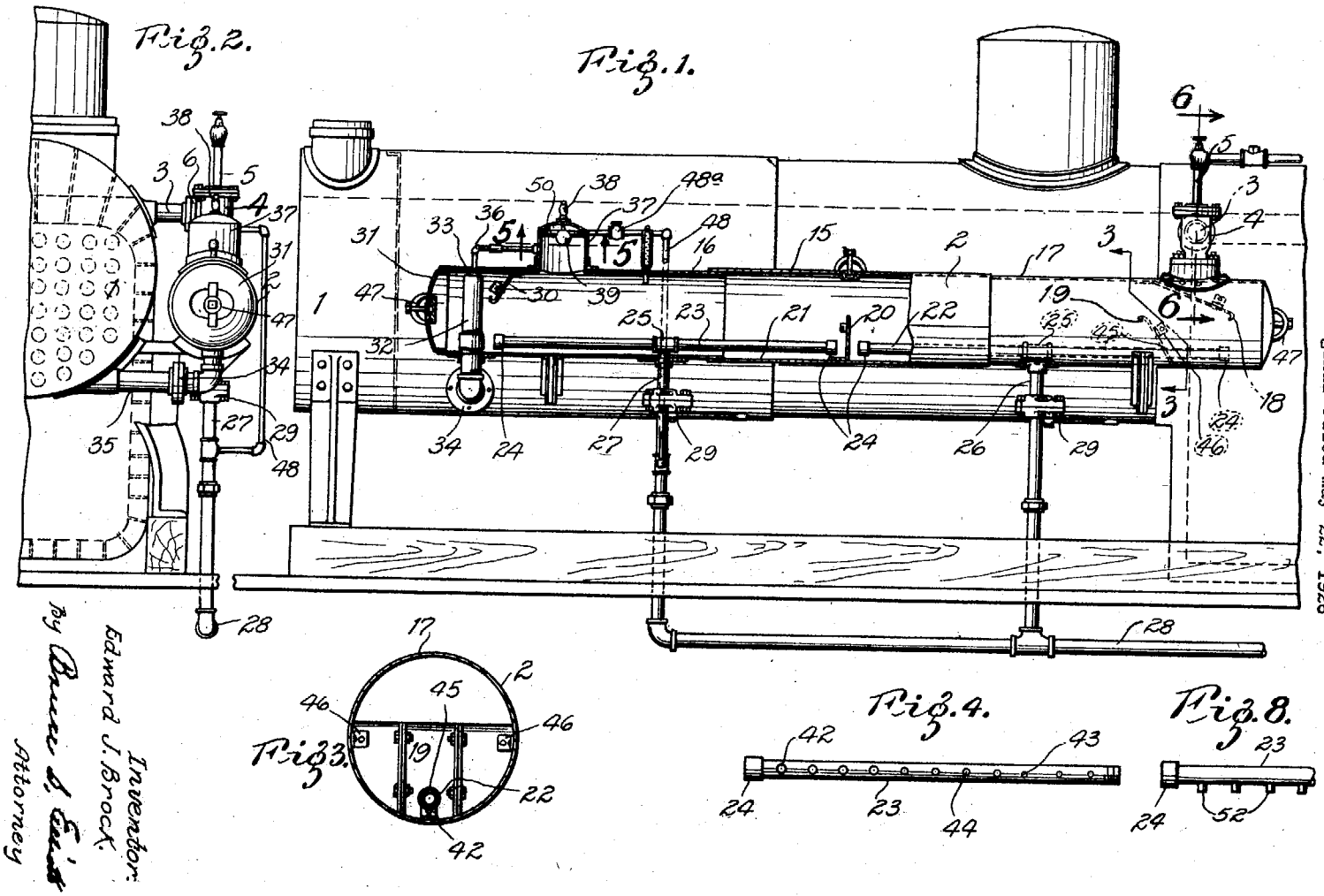
Inventor:
Edward J. Brock.
By Bruce S. Ellis
Attorney

E. J. BROCK

March 22, 1932. WATER PURIFIER Re. 18,388

2 Sheets-Sheet 2

Original Filed May 22, 1926

Inventor:
Edward J. Brock,
By Brown S. Ellsworth
Attorney

Reissued Mar. 22, 1932

Re. 18,388

UNITED STATES PATENT OFFICE

EDWARD J. BROCK, OF ST. LOUIS, MISSOURI

WATER PURIFIER

Original No. 1,794,395, dated March 3, 1931, Serial No. 110,900, filed May 22, 1926. Application for reissue filed August 7, 1931. Serial No. 555,637.

This invention relates to water purifiers such as used in conjunction with boilers for mechanically removing sediment and impurities in the feed water before introducing it into the boiler. While features of the invention may be applied to steam boilers of different types, in the present specification, I have described the invention as applied to a locomotive type of boiler.

The general object of the invention is to provide improved means for facilitating the deposit of sediment within the purifier; to provide improved means for removing the sediment; to provide means for preventing the formation of air pockets within the purifier which might interfere with its effective operation; to provide an improved construction and arrangement of mixing chamber for the hot water from the boiler and the cold water admitted to the purifier for treatment; to provide a blow-off in the purifier dome for removing oil, scum, and the like, floating on the surface of the water; to provide improved means for trapping the air in the purifier dome and automatically permitting the escape of the same; to provide a novel construction of blow-off pipes located in the bottom of the purifier to insure that the sediment will be discharged from the purifier through the length of said pipes; to provide a plurality of blow-off pipes arranged to discharge at their longitudinal centers, whereby the expulsion of sediment from the purifier is facilitated; and, finally, the employment of means for preventing the enlargement of the apertures in the blow-off pipes, due to the abrasive action of the sediment passing through the apertures. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a side elevation of a locomotive type of boiler with a purifier embodying my invention associated therewith, a portion of the purifier being broken away and shown in longitudinal section;

Fig. 2 is a view in end elevation of the same;

Fig. 3 is a cross-sectional view on the line 3—3 of Fig. 1;

Fig. 4 is a bottom plan view of the sediment pipe;

Similar reference characters indicate corresponding parts throughout the several views of the drawings.

Figure 6:
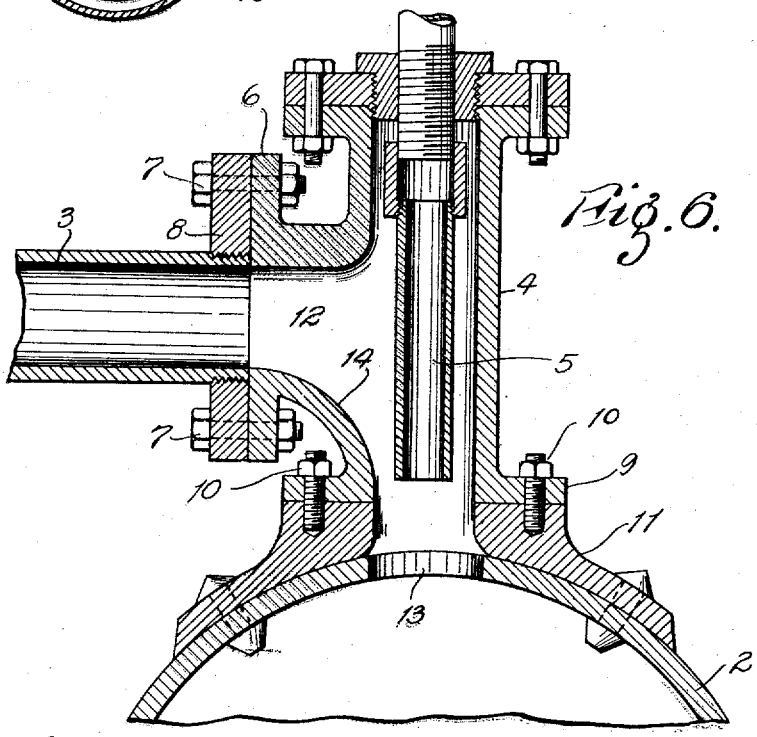
Fig. 6 is a sectional view on an enlarged scale taken on the line 6—6 of Fig. 1, showing my improved construction of mixing chamber.

Referring more particularly to the parts, numeral 1 represents a boiler which may be of a locomotive type, alongside of which my purifier 2 is mounted. This purifier consists of an elongated shell, the longitudinal axis of which is supported in a substantially horizontal position below the water level of the boiler. The righthand end of the purifier is the inlet end and receives water from the boiler through a connection 3 (Fig. 6) and coupling 4, through which latter extends a feed water pipe 5. The coupling 4 is provided on the side adjacent the connection 3 with a flange 6 (Fig. 6) and is preferably connected to the connection 3 by being bolted, as at 7, to a metal plate 8 screwed on the end of the connection. At its lower end, the coupling is provided with a flange 9 which is bolted, as at 10, to a casting 11 riveted on the top of the purifier 2 near one end thereof. The coupling 4 is provided with a throat 12 communicating with the connection 3 and which extends through the flange 9 and communicates with an opening in the casting 11 which, in turn, communicates with an opening 13 in the top of the purifier 2. The lower side of the throat 12 extending from the end of the connection 3 to the opening in the casting 11 is curved, as indicated at 14, which construction permits of the easy flow of the water from the boiler to the purifier without an abrupt change in its course, thus reducing the friction. The feed water pipe 5 extends to near the lower end of the throat 12, but terminates within the throat, so that as the cold feed water is discharged from the lower end of this pipe, it tends to produce a siphon effect and to withdraw the hot water from the boiler and thus promote the circulation of the same with the cold water through the purifier. The throat 12 also affords a mixing chamber for the hot and cold water. This arrangement also avoids an objection incident to certain prior constructions in that in the latter, the outlet passage to the purifier 2 would very frequently become clogged by deposits from the water entering through the pipe 5. In the construction described and shown in Fig. 6, a free passage of relatively large diameter is provided for the passage of the water into the shell 2, and this passage will be automatically kept clean by the flow of the water into the shell. Further, the lower end of the pipe 5 extends to near the opening 13 of the shell. This opening is preferably made of considerably larger diameter than the pipe 5, so that the feed water, which contains most of the impurities, will tend to pass directly from pipe 5 into the purifier through said opening without affording opportunity for impurities therein to deposit on the wall of the throat.

The connection 3 to the boiler should be made over the crown-sheet, indicated in dotted lines, as this is the point where the greatest heat in this type of boiler is being received by the water within the boiler. This is exemplary of the connection which should be made to any type of boiler, namely, at the point of greatest heating.

The purifier 2 is preferably formed in sections, the present construction involving a central section 15 and two end sections telescoped into the ends of the central section and indicated by the numerals 16 and 17, respectively.

The water passes from the throat 12 down onto a longitudinally inclined baffle 18, which is preferably set at an angle of approximately 22°, and which prevents the incoming water from agitating the water and sediment within the purifier and also causes the water to have a longer course of travel. On the bottom of the shell of the purifier, I preferably provide two baffles or baffle plates, the one, indicated by the numeral 19, being located toward the feed end of the purifier, and the other, 20, being located centrally of the purifier. These baffles tend to prevent or to interrupt circulation along the bottom 21 of the purifier, so that the sediment will accumulate and deposit on said bottom. In order to discharge the sediment from the purifier 2, I provide two or more sediment discharge pipes 22 and 23, respectively, the discharge pipe 22 extending from a point adjacent to the baffle plate 20 to a point near the right hand end of the purifier, as shown in Fig. 1, and the discharge pipe 23 extending from a point adjacent the baffle plate 20 to a point near the left hand end of the purifier. Each of these sediment discharge pipes 22 and 23 is closed at its opposite ends by caps 24 and is provided along its bottom with perforations, later to be referred to. Each of these pipes is preferably formed in two sections connected centrally to a T-coupling 25, and to each of these couplings is connected an outlet pipe 26 and 27, respectively, which connect at their lower ends to a main blow-off pipe 28. Each of the connections 26 and 27 is provided with its individual valve 29, which enable the two sediment pipes to be blown out independently if desired. This arrangement permits the use of pipes of relatively small size, which are convenient and economical to operate. Moreover, when the section of the purifier on one side of the baffle plate 20 is blown out, this operation does not disturb the sediment in the other part of the purifier.

On the upper side of the purifier and projecting downwardly into the interior at preferably an angle of approximately 47°, I provide a baffle plate 30 near the outlet end of the purifier, which operates to retard the circulation along the upper part of the purifier and to increase the extent of the circulation. Between the baffle plate 20 and the end or head 31 of the purifier, I provide an outlet standpipe 32, having its mouth 33 disposed at an elevation within the purifier; that is to say, the mouth 33 is very close to the upper wall of the purifier, so that substantially only clear soft water will enter this standpipe. The pipe 32 is vertical and is connected at its lower end to a standard coupling 34, which connects with the end of a pipe 35 leading into the bottom of the boiler, this construction providing a passage through which the treated water is led from the purifier into the boiler, where the water in the boiler is the coolest.

By reason of the pressure and location of the baffle plate 30, an air pocket is formed in which air tends to accumulate in the vicinity of the mouth 33 and to stop the circulation in the purifier when the latter is first filled. In order to prevent this, I provide means for releasing any air which may accumulate at this point.

For this purpose, I provide a by-pass connection 36. I prefer to make this connection operate to automatically release air from the vicinity of the mouth 33 to an air, oil and sediment trap 37 which I provide on the upper side of the purifier back of the baffle 30. The by-pass connection 36 is connected to the shell over the top of the stand-pipe 32 and communicates with the trap 37 through the side thereof at a point preferably about midway of its height. The trap 37, due to the high temperature in the purifier, operates to trap any air, oil and sediment moving along the upper side of the shell of the purifier, as will be understood. In order to provide for releasing air which may accumulate in this trap, I provide, according to one construction, a release valve 38 of any suitable construction, provided with a float 39, or any other similar device, which operates to hold the valve closed so long as water is at the proper level in the trap, but permits the valve to open and release the air when the water level in the trap drops below a predetermined point, due to accumulation of air in the trap.

Figure 7:
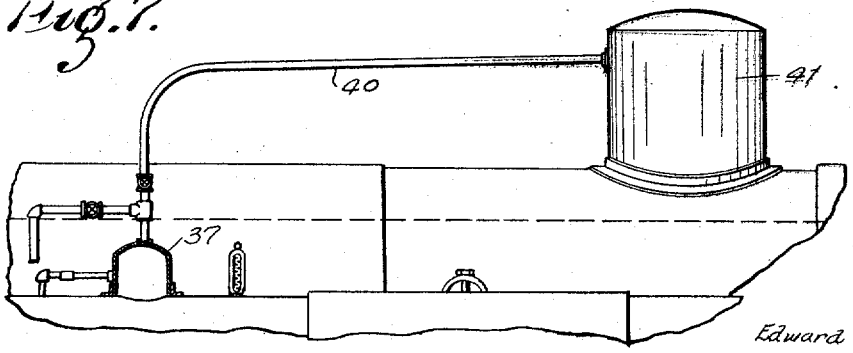
Fig. 7 illustrates a modified construction in which the air trapped in the dome of the purifier passes directly to the steam dome of the boiler; and, Fig. 8 shows a section in side elevation of one of the blow-off pipes having nipples secured in the apertures to prevent enlargement of the latter.

In Fig. 7, I show another means of releasing the air from the trap 37, which consists in running a pipe 40 from the top of said trap to the steam dome 41 of the boiler. In this construction, the air is always free to escape from the trap.

The sediment pipes 22 and 23 are provided, as previously stated, with perforations, and these are preferably located on the underside only of the pipes and extend throughout their length. When either or both of the valves 29 are opened, the pressure existing within the water purifier will force the sediment out through the perforations and through their outlet connections 26 and 27. The character of these perforations is indicated in Fig. 4. These perforations are formed so that they are of a size or diameter which increases in a direction extending away from the outlet connection; in other words, the perforations 42, which are at or near the remote end of the pipe, are of much larger diameter than the perforations 43, which lie adjacent to the outlet connection. According to this invention, the size of the openings in the pipes 22 and 23 is such that their total area will equal the area of the outlet pipes 26 and 27, allowance being made also for friction. This arrangement insures that the sediment will be discharged substantially equally into all parts of the sediment pipes, as it will be obvious that if the perforations were of the same size, the majority of the sediment would pass through the openings adjacent the outlet pipes, while practically no sediment would pass through the openings towards the ends of the pipe. This objection is overcome by my arrangement, as explained, so that when the valves are open, the sediment is removed from the bottom of the purifier throughout its entire length, as the entire length of each of the sediment pipes is rendered effective for this purpose.

It is not necessary, however, that these perforations should each be of a different size from the others, but it is more convenient in practice to form them in sets of the same diameter, there being one set of smallest diameter, another set of largest diameter, and an intermediate set corresponding to the perforation 44, which is of an intermediate diameter. The baffle 19 is provided with an opening 45 (Fig. 3) through which the sediment pipe 22 may extend. As shown by Fig. 3, this baffle is preferably made in three connected sections and is connected to the sides of the purifier by means of brackets 46 riveted to the outer section of the plates and to the shell of the purifier, as shown. This is likewise true of the baffles 18 and 30, and the sectional construction of these baffles and their location permits them to be detached and removed through one or the other of the handholes 47, located at opposite ends of the purifier, for repairs.

In practice it is found that most of the sediment accumulates in the inlet end of the purifier, and, therefore, an outlet connection 26 must be opened much more frequently than the outlet connection 27. The baffle plate 20 facilitates the operation of blowing out one end of the purifier, as to tends to prevent the disturbance of the sediment in the opposite end. This baffle, therefore, performs a function in this respect in addition to its other function of tending to facilitate the deposit of sediment in the inlet end of the purifier. The baffle 19 directs the circulation to the top of the shell and, to a large extent, prevents the sediment in the bottom of the shell from being stirred up and affords, therefore, a quiet zone and ample space in which the impurities may settle out of the water. The baffle 30, of course, prevents the direct flow of the water along the top of the purifier through the outlet 33 of stand-pipe 32, and by directing the circulation downward, tends to cause the impurities, which are heavier than the water, to pass to and settle on the bottom of the purifier, so that only relatively pure water will rise and pass into the mouth 33.

Figure 5:
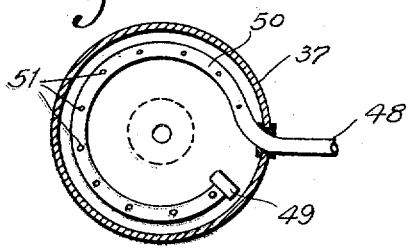
Fig. 5 is a bottom plan view of a blow-off pipe located in the dome of the purifier.

The surface of the water in the trap 37 will, after a time, be covered with scum, oil and the like, and in order to remove this, I provide a surface blow-off, which is illustrated in bottom plan view in Fig. 5. This blow-off is in the form of a pipe 48 which, at one end, as shown by Fig. 1, is connected to the blow-off pipe 27 below the valve 29, and at its upper end, has a horizontal extension entering the side of the trap 37 near the top thereof, and there bent to substantially encircle the interior of said trap, its outer end being closed by a cap 49. The circular portion of this blow-off pipe within the trap is indicated by the numeral 50 and its underside is provided with a series of apertures 51, which decrease in diameter, as shown, from the outer end containing the cap 49 to the entrance point of the pipe 48. The total area of the apertures 51 is made to equal the area of the pipe 48, allowance being made for friction, and in this way, all of the apertures in the blow-off portion 50 are effective in removing scum from the surface of the water in the trap. This action, of course, occurs whenever the valve 48*a* in pipe 48 is opened.

I have described the sediment pipes 22 and 23 as having apertures. Preferably, in order to prevent these apertures from being enlarged by abrasion of the sediment passing through them, I provide each of the apertures with a nipple 52, preferably of hardened steel, which are preferably screwed into the apertures and the bores of which would have the same diameter as the apertures if the latter are used without the nipples. These nipples, when worn by abrasion, can be readily removed and new nipples substituted in their place. In this way, the life of the sediment pipes may be very greatly increased and their action maintained uniform. Without the use of these nipples, the apertures in the sediment pipes soon become so enlarged that new sediment pipes must be substituted for the old ones at such frequent intervals as to render it quite an item of expense. Further, these nipples extend down to the bottom of the shell of the purifier, so that more of the sediment is removed therefrom in the blowing out process than when the perforations alone are employed, as it is impracticable to locate the sediment pipes close enough to the bottom to meet this requirement.

The purifier, in practice, is set at an incline, so that its outlet end is slightly higher than the inlet end in order to facilitate the passage of air along the top of the purifier to the air trap 37. The scale of the drawings relative to the actual size of the purifier, namely about twenty feet, is very small, and as the inclination is very slight such inclination would scarcely be perceptible to the eye, and no attempt has been made to illustrate it. I desire to state the fact, however, in the interest of a full disclosure of the invention.

The length of the auxiliary purifier drum as assembled should be long enough to insure complete precipitation, as shown by the proportions in the drawings. In order to accomplish the proportions shown, it will be noted that the purifier drum is arranged with its axis parallel to the axis of the boiler to which it is attached. Thus the proper length of the purifier can be effected without sacrificing an excessive amount of floor space. This construction permits the purifier drum to be put close to the boiler.

The addition of the purifier to a boiler results in a reduction of boiler strains ordinarily caused by the great difference in temperature between the feed water and the boiler water.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a water purifier, the combination of an elongated shell having an inlet connection for boiler water and feed water at one end, and an outlet connection to the boiler at the other end of the shell, said shell being disposed with its longitudinal axis in a substantially horizontal position, a vented air-dome adjacent one end of said shell on the upper side thereof, a baffle extending down from the upper side of the shell between the outlet connection and the air-dome and to a point below the outlet connection, a pipe connection through the upper side of the shell between the baffle and the end of the shell and leading into the air-dome, said last-named connection operating to conduct air from the end of the shell into the air-dome, and means whereby said air-dome may be automatically evacuated through the vent therein.

2. In a water purifier, the combination of an elongated shell having an inlet connection for boiler water and feed water at one end, and an outlet connection to the boiler at the other end of the shell, said shell being disposed with its longitudinal axis in a substantially horizontal position, an air-dome adjacent one end of said shell on the upper side thereof, a baffle extending down from the upper side of the shell between the outlet connection and the air-dome, a pipe connection through the upper side of the shell between the baffle and the end of the shell and leading into the air-dome, said last-named connection operating to conduct air from the end of the shell into the air-dome, a sediment blow-off pipe communicating with the interior of the purifier, a surface blow-off located in said dome and having a valve-controlled pipe communicating with said sediment blow-off pipe, and means whereby said air-dome may be evacuated.

3. In a water purifier, the combination of an elongated shell having an inlet connection for boiler water and feed water at one end, and an outlet connection to the boiler at the other end of the shell, said shell being disposed with its longitudinal axis in a substantially horizontal position, an air-dome adjacent one end of said shell on the upper side thereof, a baffle extending down from the upper side of the shell between the outlet connection and the air-dome, a pipe connection through the upper side of the shell between the baffle and the end of the shell and leading into the air-dome, said last-named connection operating to conduct air from the end of the shell into the air-dome, a sediment blow-off pipe communicating with the interior of the purifier, a surface blow-off located in said dome and having a valve-controlled pipe communicating with said sediment blow-off pipe, said surface blow-off comprising a curved pipe having a closed end and provided on its underside with perforations of progressively increased size in a direction toward said closed end and the total area of said perforations equalling the area of said valve-controlled pipe, plus allowance for friction and means whereby said air-dome may be evacuated.

4. In a water purifier, the combination of an elongated shell having an inlet connection for boiler water and feed water at one end, and an outlet connection to the boiler at the other end of the shell, said shell being disposed with its longitudinal axis in a substantially horizontal position, an air-dome adjacent one end of said shell on the upper side thereof, a baffle extending down from the upper side of the shell between the outlet connection and the air-dome, a pipe connection through the upper side of the shell between the baffle and the end of the shell and leading into the air-dome, said last-named connection operating to conduct air from the end of the shell into the air-dome, and a float-controlled release valve mounted in the top of said dome.

5. In a water purifier to operate in conjunction with a boiler, the combination of an elongated shell, a connection, including a feed water pipe, at one end of the shell and connecting with the boiler to introduce a mixture of boiler water and feed water into the end of the purifier, a baffle plate connected to the upper portion of the shell adjacent said end directly under the outlet from said connection to the purifier and directed downwardly and toward the said end, a baffle plate in the lower portion of said shell adjacent said end and directed upwardly and toward the other end of the purifier, an outlet pipe leading from the other end of the purifier into the boiler and having its inlet mouth in the interior of the purifier at an elevated level therein, a baffle plate in the upper portion of the shell adjacent the said outlet pipe and projecting downwardly within the shell, the last mentioned baffle plate being adapted to lengthen the path of circulation of the water moving toward said outlet pipe, a sediment pipe disposed in the bottom of the shell having an outlet connection through the shell, and a valve for controlling the same.

6. In a water purifier, the combination of an elongated shell having an inlet connection for boiler water and feed water at one end, and an outlet connection to the boiler at the other end, and disposed with the longitudinal axis of the shell in a substantially horizontal position, a sediment pipe disposed at the bottom of the shell toward one end of the same, and having an outlet connection through the shell, a second sediment pipe disposed toward the other end of the shell and having an outlet connection through the shell, an individual valve corresponding to each sediment pipe enabling either sediment pipe to be operated independently of the other, a baffle plate at the outlet end of the shell, another baffle plate on the bottom of the shell at the inlet end thereof, and a third baffle plate at the bottom of the shell disposed between the ends of the sediment pipes.

7. In a water purifier to operate in conjunction with a boiler, the combination of an elongated shell, a connection including a feed water pipe at one end of the shell and connecting with the boiler to introduce a mixture of boiler water and feed water directly into the end of the purifier, an outlet pipe leading from the other end of the purifier into the boiler and having its inlet mouth in the interior of the purifier at an elevated level therein, a baffle plate in the upper portion of the shell adjacent the said outlet pipe and projecting downwardly within the shell, said baffle forming with the end of the shell a pocket inclosing the inlet mouth of said pipe, a sediment pipe disposed in the bottom of the shell having perforations along its length to admit the sediment, said sediment pipe having an outlet connection through the shell and a valve for controlling the same, a vented air dome and means adapted to cause air to escape from said pocket, comprising a pipe connection outside of the shell between said pocket and said dome and means for automatically opening the vent of said air dome when the liquid level in said dome is below a predetermined point.

8. In a water purifier to operate in conjunction with a boiler, the combination of an elongated shell, a connection including a feed water pipe at one end of the shell and connecting with the boiler to introduce a mixture of boiler water and feed water directly into the end of the purifier, an outlet pipe leading from the other end of the purifier into the boiler and having its inlet mouth in the interior of the purifier at an elevated level therein, a baffle plate in the upper portion of the shell adjacent the said outlet pipe and projecting downwardly within the shell, said baffle forming with the end of the shell a pocket inclosing the inlet mouth of said pipe, a sediment pipe disposed in the bottom of the shell adjacent one end thereof, a second sediment pipe disposed in the bottom of the shell toward the other end thereof, each of said sediment pipes having an outlet connection through the shell and a valve for controlling the same, and also having perforations along its length to admit the sediment, an air dome having a vent and means adapted to cause air to escape from said pocket, into said dome comprising a connection from said pocket to said dome, said connection being outside of the shell and automatic means for opening said vent from time to time.

9. In a water purifier for a boiler, the combination of an elongated, substantially horizontal shell having means for directly introducing hot boiler water at one end, means for directly introducing feed water at said end, an outlet connection to the boiler from said shell at the other end and having its mouth in an elevated position within said shell, a raised dome on said shell between the ends, a baffle located on the shell between said outlet connection and said dome considered lengthwise and extending to a point below the outlet connection, and a pipe connecting the shell on the outlet side of the baffle and the dome, said dome having a vent adapted to release excessive amounts of air from the dome.

10. In a water purifier for a boiler, the combination of an elongated, substantially horizontal shell having an inlet connection at one end for directly introducing boiler water, means for directly introducing feed water at said end, an outlet connection to the boiler from said shell at the other end and having its mouth in an elevated position within said shell, a raised, automatic air release on said shell, a baffle located on the shell between said outlet connection and said air release and extending to a point below the outlet connection, and a connection between the shell on the outlet side of the baffle and the air release, the said connection joining the air release at a point other than the point of connection of the air release to the shell.

11. In a water purifier for a boiler, the combination of an elongated and substantially horizontal shell having a direct inlet connection for boiler water at one end, means for directly introducing feed water with said boiler water, an outlet connection to the boiler from the other end of said shell and having its mouth at an elevated position in the shell, a dome on said shell having an air release, a baffle located on the shell between said outlet connection and said dome considered lengthwise and extending to a point below the outlet connection, a connection between the shell on the outlet side of the baffle and the dome on said shell, said connection being outside of said shell.

12. In a water purifier for a boiler having a dome, the combination of an elongated shell having a direct inlet connection for boiler water at one end, means for directly introducing feed water with said boiler water, an outlet connection to the boiler from the other end of said shell, a dome on said shell, a baffle located on the shell between said outlet connection and said dome considered lengthwise, a connection between the shell at the outlet side of the baffle and the dome on said shell, said connection being outside of said shell, and a connection between the dome on the shell and the dome on the boiler.

13. In a water purifier for a boiler, the combination of an elongated, substantially horizontally positioned shell having an inlet and an outlet, the outlet end of the shell being slightly raised with respect to the inlet end so as to drive entrapped air to said outlet end, means for introducing hot boiler water at the inlet end, means for introducing feed water at said end, a dome on the shell near the outlet end, an air connection between the shell adjacent said outlet and leading to the dome and a baffle depending from the top of the shell between the dome and said air connection, said baffle extending downwardly to a point below the point of connection of said outlet to said shell.

In witness whereof, I have signed my name to the foregoing specification.

EDWARD J. BROCK.